(12) United States Patent
Boywitz et al.

(10) Patent No.: US 7,244,330 B2
(45) Date of Patent: Jul. 17, 2007

(54) METHOD FOR BONDING A LAYER OF THERMOPLASTIC POLYMER TO THE SURFACE OF AN ELASTOMER

(75) Inventors: Axel Boywitz, Norderstedt (DE); Marco Michel, Hamburg (DE)

(73) Assignee: Hellermann Tyton GmbH, Tornesch (DE)

( * ) Notice: Subject to any disclaimer, the term of this patent is extended or adjusted under 35 U.S.C. 154(b) by 82 days.

(21) Appl. No.: 10/555,920

(22) PCT Filed: Sep. 2, 2004

(86) PCT No.: PCT/EP2004/009799

§ 371 (c)(1),
(2), (4) Date: Nov. 7, 2005

(87) PCT Pub. No.: WO2006/024316

PCT Pub. Date: Mar. 9, 2006

(65) Prior Publication Data

US 2007/0051460 A1    Mar. 8, 2007

(51) Int. Cl.
*B29C 65/12*    (2006.01)
(52) U.S. Cl. .................... 156/272.8; 156/272.2
(58) Field of Classification Search ............ 156/272.2, 156/272.8
See application file for complete search history.

(56) References Cited

U.S. PATENT DOCUMENTS 5,279,693 A    1/1994    Robinson et al.

6,500,296 B1 *    12/2002    Weihrauch ............... 156/272.8

FOREIGN PATENT DOCUMENTS

| DE | 3621030 A1 | 1/1988 |
|---|---|---|
| EP | 0 159 169 | 10/1985 |
| EP | 0 483 569 A1 | 5/1992 |
| EP | 0 751 865 | 1/1997 |
| FR | 1 506 163 | 12/1967 |
| WO | WO 89/10832 | 11/1989 |

OTHER PUBLICATIONS

Chung-Yuan Wu, D. Mark Douglass: "Fiber Laser Welding of Elastomer to TPO" ANTEC, 2004 XP-002325212 p. 1227-1230.*
"Harte und Weiche Kunststoffe Mit Diodenlaser Verbinden. Joining Hard and Soft Plastics with a Diode Laser". Kunststoffe, Carl Hanser Verlag. Munchen, DE, vol. 88, No. 2, Feb. 1998 pp. 210-212, XP000732887 ISSN: 0023-5563 Figure 3; Table 1.
"Welding Thermoplastic Elastomers to Polypropylene with a Diode Laser". Proc. ICALEO 2002, 2002, xp009046528.

* cited by examiner

*Primary Examiner*—Jeff H. Aftergut
*Assistant Examiner*—Daniel McNally
(74) *Attorney, Agent, or Firm*—Alix, Yale & Ristas, LLP

(57) ABSTRACT

Method for bonding a layer of thermoplastic polymer to the surface of an elastomer. A foamed elastomer having, preferably, an open-pore surface is used. The thermoplastic layer is pressed against this surface while it is heated by heat radiation, in particular laser light. The thermoplastic layer is transparent to this radiation, whereas it is absorbed by the surface of the elastomer.

6 Claims, No Drawings

METHOD FOR BONDING A LAYER OF THERMOPLASTIC POLYMER TO THE SURFACE OF AN ELASTOMER

BACKGROUND OF THE INVENTION

Elastomeric materials which are not thermoplastic cannot be welded to thermoplastics. They have to date therefore generally been bonded by adhesive bonding. This is complicated, and owing to the use of solvents, environmentally undesired. Furthermore, some thermoplastics are poorly accessible to adhesive bonding, for example polyethylene.

It is known (EP-B-0751865, DE-A-3621030, EP-A-159169, EP-A-483569, U.S. Pat. No. 5,279,693, FR-A-1506163, WO 89/10832) that two thermoplastic parts can be bonded by means of laser beams for which the upper of the two parts is transparent and which are absorbed in the region of the weld joint. As a result of the absorption in a thermoplastic material, the latter becomes molten and is therefore directly capable of effecting welding to the counter-surface. This is also true when one of the two parts consists of a thermoplastic elastomer (Hänsch et al., "Harte und weiche Kunststoffe mit Diodenlaser verbinden" [Bonding hard and soft plastics using diode lasers] in Kunststoffe [Plastics] 1988, pages 210-212. A precondition for a reliable cohesive bond is, however, that the polymers are miscible with one another, which is often problematic precisely when one of the two parts consists of an elastomer. Difficulties often also arise because the heat draws away toward the back in the part absorbing the radiation and is therefore not available for welding, so that weld faults occur.

The invention is concerned especially with the bonding of a thermoplastic polymer layer to the surface of an elastomer. It is the object of the invention to provide a reliable bonding method which manages without an adhesive.

SUMMARY OF THE INVENTION

Briefly stated, the invention in a preferred form is a method for bonding a layer of thermoplastic polymer to the surface of an elastomer, wherein the thermoplastic layer is pressed against the surface of the elastomer while the elastomer is heated by heat radiation to which the thermoplastic layer is transparent and the surface of the elastomer absorbs and which is introduced by irradiation through the thermoplastic layer. The method is characterized in that a foamed elastomer is used. The elastomer preferably has an open-pore surface. The heat radiation is preferably formed by laser light. The thermoconductivity of the elastomer is preferably less than 0.2 W/mK.

DETAILED DESCRIPTION OF THE PREFERRED EMBODIMENTS

The method according to the invention differs from the known method last discussed in that a foamed elastomer is used. If the thermoplastic layer is pressed onto the surface to be bonded thereto, substantially only the surface of the elastomer is heated by the heat radiation, in particular infrared radiation.

That a good bond is nevertheless established is due to the peculiarity that the elastomer has a low thermal conductivity as a result of being formed, and the heat converted in its surface therefore cannot flow away rapidly toward the back. The surface of the elastomer can therefore be heated to such an extent that the surface of the thermoplastic layer which is pressed against it is sufficiently liquefied by heat conduction to be able to form an adequate bond to the surface of the elastomer. In order to achieve this effect, the thermal conductivity of the elastomer directly behind its surface (i.e. at a distance from the surface which is not greater than 0.5 mm, preferably not greater than 0.2 mm) is expediently less than 0.2 and more preferably less than 0.13 W/mK.

The invention claimed is:

1. A method for bonding a layer of thermoplastic polymer to the surface of an elastomer, in which the thermoplastic layer is pressed against the surface of the elastomer, while the latter is heated by heat radiation, to which the thermoplastic layer is transparent and the surface of the elastomer absorbs and which is introduced by irradiation through the thermoplastic layer characterized in that a foamed elastomer is used.

2. The method as claimed in claim 1, characterized in that the elastomer has an open-pore surface.

3. The method as claimed in claim 1, characterized in that the heat radiation is formed by laser light.

4. The method as claimed in claim 1, characterized by a thermal conductivity of the elastomer of less than 0.2 W/mK.

5. The method as claimed in claim 2, characterized in that the heat radiation is formed by laser light.

6. The method as claimed in claim 2, characterized by a thermal conductivity of the elastomer of less than 0.2 W/mK.

* * * * *